Feb. 23, 1937.   L. SCRUGGS   2,071,954
CHUCK OR TOOL HOLDER
Filed June 22, 1935
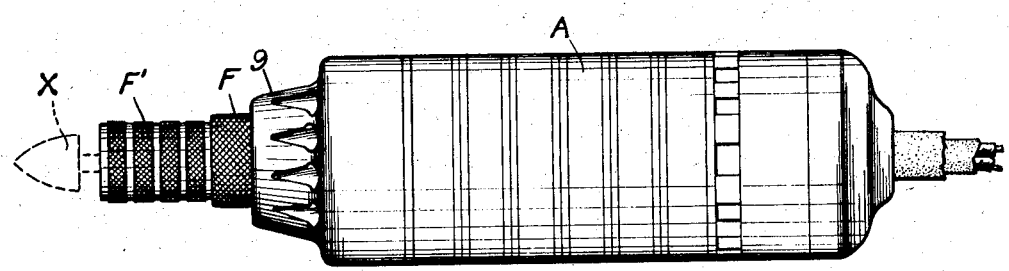
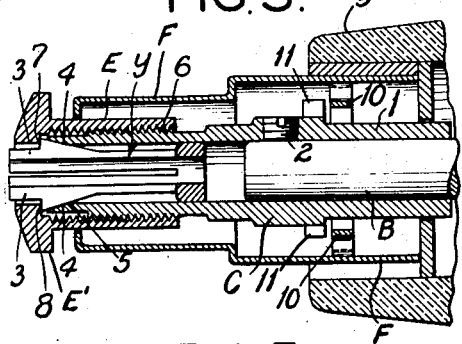
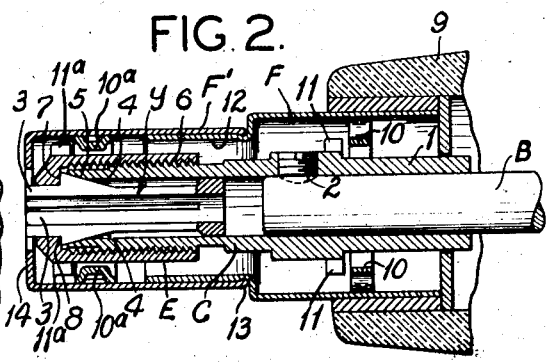
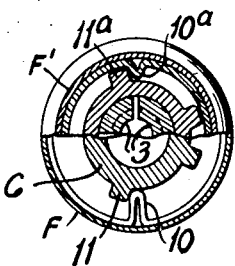
INVENTOR;
LOYD SCRUGGS
By Bakewell & Church
ATTORNEYS Patented Feb. 23, 1937

2,071,954

UNITED STATES PATENT OFFICE 2,071,954

CHUCK OR TOOL HOLDER

Loyd Scruggs, University City, Mo.

Application June 22, 1935, Serial No. 27,894

2 Claims. (Cl. 279—52)

This invention relates to tool chucks, holders and similar devices that are used to detachably connect a tool, instrument or implement to a revolving shaft that drives or rotates said tool.

The main object of my invention is to provide a chuck or holder for a portable tool or manually manipulated tool, which is of such design or construction that the user's fingers which guide or manipulate the tool may be arranged much closer to or nearer to the tool than is possible with tool chucks of conventional construction, thereby enabling the tool to be guided, manipulated, or controlled with great accuracy.

Another object of my invention is to provide a tool chuck of the kind above referred to, that can be operated easily and conveniently to clamp or release the tool held by the chuck. Other objects and desirable features of my invention will be hereinafter pointed out.

Figure 1 of the drawing is a side elevational view of a portable, fractional horsepower, electric motor, whose armature shaft is provided with a tool chuck or holder constructed in accordance with my invention.

Figure 2 is an enlarged longitudinal sectional view of the tool chuck shown in Figure 1.

Figure 3 is a longitudinal sectional view, illustrating another form of my invention.

Figure 4 is a longitudinal sectional view similar to Figure 2, showing the shield in the position it occupies when the jaw actuating device of the chuck is being operated to clamp or release the tool carried by the chuck.

Figure 5 is a cross-sectional view, taken on the line 5—5 of Figure 4; and

Figure 6 is an exploded view, illustrating the co-acting parts of the chuck.

In the accompanying drawing A designates a portable, hand-manipulated device or apparatus, such, for example, as a fractional horsepower, electric motor, whose armature shaft B is provided with a chuck or tool holder that carries a tool, instrument or appliance $x$, shown in broken lines in Figure 1. The chuck or tool holder which constitutes my present invention differs from conventional tool chucks, principally in that it is provided with or comprises a shield and finger grip arranged in close proximity to the tool $x$ and adapted to be grasped by the fingers of the user in the operation of guiding or manipulating the tool, thereby enabling the tool to be guided or manipulated more accurately than is possible with tool chucks of conventional construction, due to the fact that the user's fingers by which the tool is guided or manipulated, are located right at the tool, instead of at a point located a considerable distance away from the tool. Another distinguishing characteristic of my improved chuck is that it is equipped with a compact and easily operable means by which the user can quickly clamp or release the tool held by the chuck, notwithstanding the fact that the supporting member of the chuck which carries the tool gripping jaws, is concealed or housed in a part which the user's fingers grasp in the operation of guiding or manipulating the tool. The above characteristics, coupled with the fact that the chuck is inexpensive to construct and easy to combine with a portable, hand-operated apparatus provided with a power-driven shaft, makes the chuck a decided improvement on those heretofore used for detachably connecting a tool or instrument to an operating shaft.

As is usual, the chuck comprises a supporting member rigidly attached or connected to the drive shaft, and expansible and contractible jaws on said supporting member that grip and hold the tool. The said jaws may be of any preferred construction, but I prefer to form the tool gripping portion of the chuck from a conventional spring collet $y$ arranged inside of a supporting member C that is adapted to be attached to the drive shaft B, said supporting member being herein illustrated as provided with a tubular portion 1 which fits over the end of the drive shaft and is securely connected to same by a set screw 2 mounted in said tubular portion, as shown in Figure 2. The collet $y$, which is arranged inside of the supporting member C, is provided with expansible and contractible gripping jaws 3 having inclined external surfaces 4 which co-act with an oppositely-inclined surface 5 in the end of the supporting member C to move said jaws inwardly into clamping engagement with the shank of the tool $x$ when an actuating nut E on said supporting member is rotated in one direction. When said actuating nut is rotated in the opposite direction, the jaws 3 will expand and thus release the tool.

As shown in the drawing, the jaw actuating nut E is mounted on an externally screw-threaded portion 6 of the supporting member C and is provided at its front end with an inwardly-projecting flange or portion 7 that surrounds the jaws 3 and bears against a shoulder or bearing surface 8 on the collet which is disposed at right angles to the longitudinal axis of the chuck. When the nut E is rotated in a direction to cause it to travel longitudinally of the supporting member C in one direction, for example, to the left, looking at Figure 2, the inherent resiliency of the jaws 3 causes them to expand and simultaneously move in the direction of travel of the nut E, due to the pressure of the inclined external surfaces 4 on the oppositely-inclined surface 5 of the supporting member. When said nut E is rotated in the opposite direction, it will travel to the right, looking at Figure 2, and the flange 7 thereon will co-act with the shoulder or bearing surface 8 on the collet to move the collet endwise relatively to the supporting member C, whereby the inclined surface 5 on said supporting member, by engaging the oppositely-inclined surfaces 4 on the jaws, causes said jaws to contract and tightly clamp the shank of the tool.

In tool chucks of conventional construction, the supporting member of the chuck which carries the tool gripping jaws is unprotected and projects forwardly a considerable distance beyond the front end of the housing of the apparatus in which the drive shaft is journaled. Due to the fact that said supporting member rotates at a high speed, said member cannot be grasped or held by the user's hand in the operation of manipulating the tool, but instead, the user's hand must be positioned around the stationary housing of the apparatus which is located at a point considerably to the rear of the tool carried by the chuck. Consequently, as the user's hand is located a considerable distance to the rear of the tool, the tool cannot be guided or manipulated as accurately as if the user's hand were located right at the tool, or in close proximity to the tool. My improved chuck overcomes the above mentioned inherent objectionable characteristic of prior tool chucks, inasmuch as the rotatable jaw supporting member C of my improved chuck is surrounded, protected and concealed in a non-rotatable shield structure located in close proximity to the tool, thereby enabling the hand that guides or manipulates the tool to be arranged at a point considerably in advance of the front end of the housing of the apparatus in which the drive shaft is journaled. In the operation of clamping or releasing the tool it is necessary that the jaw supporting member of the chuck be held against rotation when the jaw actuating nut on said supporting member is turned to expand or contract the jaws, and in order that this may be accomplished quickly, easily and without the aid of a wrench or other extraneous holding device, the shield structure or finger grip previously mentioned, is so constructed that preparatory to the operation of expanding or contracting the tool gripping jaws, said shield structure is adapted to be shifted bodily into a position wherein the user's fingers which grasp said structure may be effectively used to hold the jaw supporting member against rotation when the jaw actuating nut is turned, even though said supporting member is completely housed within said shield structure.

In the accompanying drawing I have illustrated two forms of the shield structure above referred to. The one illustrated in Figure 3 comprises a single sleeve F that surrounds the supporting member C, and all but a relatively thin, knurled portion E' on the jaw actuating nut E, and the one illustrated in Figure 2 comprises two sleeves F and F', so constructed and arranged that the supporting member C and every portion of the jaw actuating nut E are housed in and protected by said shield structure. In the shield structure shown in Figure 3 the sleeve F has its front end terminating in close proximity to the knurled portion E' of the jaw actuating nut E, and said sleeve is mounted in the front end of the housing 9 of the motor A in such a manner that said sleeve can be shifted endwise relatively to the jaw supporting member C. On the interior of the sleeve F are one or more inwardly-projecting teeth 10 that are adapted to be engaged with one or more outwardly-projecting teeth 11 on the supporting member C. Normally, the sleeve F is arranged in the position illustrated in Figure 3, wherein the teeth 10 thereon are out of engagement or mesh with the teeth 11, but when it is desired to expand or release the tool gripping jaws 3, the sleeve F is moved endwise to the left, looking at Figure 3, so as to mesh the teeth 10 on said sleeve with the teeth 11 on the jaw supporting member C. In this position of the sleeve F the user's fingers which grip said sleeve may be used to effectively hold the supporting member C against rotation when the nut E is turned with the user's other hand to expand or contract the jaws 3. At the completion of the jaw expanding or contracting operation the sleeve F is moved endwise in the opposite direction, back to the position shown in Figure 3, wherein the teeth 10 thereon are inactive for holding the supporting member C against rotation. The shield structure illustrated in Figure 2 is similar in general design and principle of operation to that shown in Figure 3, with the exception that the sleeve F' acts as a shield or housing for the jaw actuating nut E and is provided on its interior with one or more inwardly projecting teeth 10ᵃ that are adapted to be engaged with one or more outwardly-projecting teeth 11ᵃ on the jaw actuating nut E, so as to impart rotary movement to said nut when the sleeve F' is turned or rotated. One convenient way of combining the rotatable sleeve F' with the non-rotatable sleeve F is to provide the sleeve F with a reduced, forwardly-projecting extension 12 on which the sleeve F' is rotatably mounted, and hold said parts in assembled relationship by deforming the inner end portion of the sleeve F', so as to form in effect an inwardly-projecting rib 13 thereon that fits in an annular depression or groove in the reduced extension 12 of the sleeve F. At the front end of the sleeve F' is an inwardly-projecting flange 14 that strengthens said sleeve and imparts a finished appearance to same. In operating the chuck illustrated in Figure 2 to clamp or release the tool, the user grasps the sleeve F and moves it forwardly into the position illustrated in Figure 4, thereby causing the internal teeth 10 thereon to mesh with the teeth 11 on the supporting member C, and also causing the internal teeth 10ᵃ on the sleeve F' to mesh with the teeth 11ᵃ on the jaw actuating nut E. By holding the sleeve F stationary with one hand, the user's other hand can be used to turn the sleeve F' and the nut E in the proper direction to expand or contract the jaws 3 of the chuck, and at the completion of the operation of clamping the tool, both of the sleeves F and F' are restored to their former position, simply by moving the sleeve F inwardly into the housing 9 of the motor far enough to cause the inner end of the sleeve F to come into engagement with a stop or abutment piece carried by said housing.

Having thus described my invention, what I claim as new and desire to secure by Letters Patent is:

1. A tool chuck, comprising a rotatable supporting member attached to a drive shaft, gripping jaws carried by said member, a rotatable actuating device for said jaws carried by said supporting member, a sleeve surrounding said supporting member and mounted so as to be capable of being reciprocated relatively to said supporting member, co-acting teeth on said supporting member and sleeve arranged to be engaged and disengaged with each other by endwise movement of said sleeve, and a rotatable part on said sleeve for turning said actuating device when the co-acting teeth on said sleeve and supporting member are engaged with each other for permitting said supporting member to be held against rotation.

2. A tool chuck, comprising a supporting member connected to a drive shaft and provided with jaws, a rotatable actuating device on said supporting member for expanding and contracting said jaws, a shield structure for housing said supporting member and actuating device, said shield structure comprising a non-rotatable sleeve and a rotatable sleeve permanently connected together and arranged so as to be capable of being shifted endwise relatively to said supporting member, internal teeth on said non-rotatable sleeve adapted to be engaged with co-acting teeth on said supporting member by shifting said sleeve endwise, and internal teeth on said rotatable sleeve that are adapted to be engaged with co-acting teeth on said actuating device.

LOYD SCRUGGS.